(12) United States Patent
Kimura et al.

(10) Patent No.: US 12,260,328 B2
(45) Date of Patent: Mar. 25, 2025

(54) NEURO-SYMBOLIC REINFORCEMENT LEARNING WITH FIRST-ORDER LOGIC

(71) Applicant: INTERNATIONAL BUSINESS MACHINES CORPORATION, Armonk, NY (US)

(72) Inventors: Daiki Kimura, Kanagawa (JP); Masaki Ono, Tokyo (JP); Subhajit Chaudhury, Kawasaki (JP); Michiaki Tatsubori, Oiso (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 842 days.

(21) Appl. No.: 17/494,055

(22) Filed: Oct. 5, 2021

(65) Prior Publication Data

US 2023/0108135 A1 Apr. 6, 2023

(51) Int. Cl.
*G06N 3/08* (2023.01)
*G06F 40/205* (2020.01)
(Continued)

(52) U.S. Cl.
CPC ............. *G06N 3/08* (2013.01); *G06F 40/205* (2020.01); *G06F 40/289* (2020.01); *G06F 40/30* (2020.01)

(58) Field of Classification Search
CPC ....................................................... G06N 3/08
(Continued)

(56) References Cited

U.S. PATENT DOCUMENTS

2018/0157977 A1\* 6/2018 Saikia ..................... G06N 5/025
2018/0349256 A1 12/2018 Fong et al.
(Continued)

FOREIGN PATENT DOCUMENTS

| CN | 109858630 A | 6/2019 |
| CN | 111382253 A | 7/2020 |
| WO | 2020068877 A1 | 4/2020 |

OTHER PUBLICATIONS

Anonymous Authors, "Interpretable Reinforcement Learning With Neural Symbolic Logic", ICLR 2021 Conference, Mar. 5, 2021, pp. 1-11 (Year: 2021).\*
(Continued)

*Primary Examiner* — Reza Nabi
(74) *Attorney, Agent, or Firm* — Tutunjian & Bitetto, P.C.; Robert Richard Aragona

(57) ABSTRACT

A computer-implemented method for reinforcement learning with Logical Neural Networks (LNNs) is provided including receiving a plurality of observation text sentences from a target environment, extracting one or more propositional logic values from the plurality of observation text sentences, finding a class for each propositional logic value by using external knowledge, converting each propositional logic value into a first-order logic by replacing a part in the propositional logic value with a variable word, the part indicating the class, selecting a LNN based on the class among LNNs prepared in advance for each class, each LNN receiving the one or more propositional logic values as a status input and outputting an action with a score indicating a degree of preference for taking the action, and performing a highest score action to the target environment to obtain a next state of the target environment and a reward for the highest score action.

20 Claims, 8 Drawing Sheets

(51) Int. Cl.
*G06F 40/289* (2020.01)
*G06F 40/30* (2020.01)

(58) Field of Classification Search
USPC .......................................................... 706/25
See application file for complete search history.

(56) References Cited

U.S. PATENT DOCUMENTS

| | | | | |
|---|---|---|---|---|
| 2019/0108448 | A1* | 4/2019 | O'Malia | G06N 3/04 |
| 2020/0320435 | A1* | 10/2020 | Sequeira | G06N 5/04 |
| 2021/0019642 | A1* | 1/2021 | O'Malia | G06F 40/279 |
| 2021/0232915 | A1* | 7/2021 | Dalli | G06F 18/2113 |
| 2021/0256377 | A1* | 8/2021 | Dalli | G06N 20/00 |
| 2021/0271817 | A1* | 9/2021 | Sen | G06F 40/289 |
| 2021/0357738 | A1* | 11/2021 | Luus | G06N 3/08 |
| 2021/0365817 | A1* | 11/2021 | Riegel | G06N 5/046 |
| 2021/0406669 | A1* | 12/2021 | Yu | G06N 3/044 |
| 2022/0036180 | A1* | 2/2022 | Archuleta | G06N 7/01 |
| 2022/0067520 | A1* | 3/2022 | Dalli | G06N 20/00 |
| 2022/0114369 | A1* | 4/2022 | Debnath | G06T 7/20 |
| 2022/0114417 | A1* | 4/2022 | Dalli | G06N 3/042 |
| 2022/0147876 | A1* | 5/2022 | Dalli | G06N 20/00 |
| 2022/0172050 | A1* | 6/2022 | Dalli | G06N 3/047 |
| 2022/0180166 | A1* | 6/2022 | Wachi | G06N 3/08 |
| 2022/0198254 | A1* | 6/2022 | Dalli | G06N 5/025 |
| 2022/0269858 | A1* | 8/2022 | Sen | G06F 40/242 |
| 2022/0277217 | A1* | 9/2022 | Francis | G06F 16/587 |
| 2022/0300799 | A1* | 9/2022 | Jiang | G06N 3/042 |
| 2023/0048764 | A1* | 2/2023 | Zheng | G16H 50/70 |
| 2023/0108135 | A1* | 4/2023 | Kimura | G06F 40/30 706/25 |
| 2023/0143937 | A1* | 5/2023 | Wachi | G06N 3/006 701/23 |
| 2023/0156556 | A1* | 5/2023 | Choi | H04W 36/32 370/331 |
| 2023/0179489 | A1* | 6/2023 | Latapie | G06N 3/082 706/25 |
| 2023/0196063 | A1* | 6/2023 | Latapie | G06N 5/045 706/26 |
| 2023/0259766 | A1* | 8/2023 | Kasioumis | G06N 3/08 706/25 |
| 2023/0274137 | A1* | 8/2023 | Makariou | G06N 3/096 706/25 |
| 2023/0409872 | A1* | 12/2023 | Makondo | G06N 3/084 |
| 2024/0320503 | A1* | 9/2024 | Kimura | G06N 3/092 |

OTHER PUBLICATIONS

Yuan et al., "Counting to Explore and Generalize in Text-based Games", 35th International Conference on Machine Learning, arXiv:1806.11525v2 [cs.CL] Mar. 7, 2019, pp. 1-12.

Dong et al., "Neural Logic Machines", 1 arXiv:1904.11694v1 [cs.AI] Apr. 26, 2019, pp. 1-22.

Riegel et al., "Logical Neural Networks", arXiv:2006.13155v1 [cs.AI] Jun. 23, 2020, pp. 1-48.

Roukos et al., "Getting AI to Reason: Using Neuro-Symbolic AI for Knowledge-Based Question Answering", IBM Research Blog, https://research.ibm.com/blog/ai-neurosymbolic-common-sense, Dec. 4, 2020, pp. 1-9.

Anonymous Authors, "Interpretable Reinforcement Learning With Neural Symbolic Logic", ICLR 2021 Conference, Mar. 5, 2021, pp. 1-11.

Kimura et al., "Reinforcement Learning with External Knowledge by using Logical Neural Networks" arXiv:2103.02363v1 [cs.AI] Mar. 3, 2021, pp. 1-4.

Authors et al., Disclosed Anonymously, "Reinforcement Learning with Logical Neural Networks", IP.com No. IPCOM000265954D, May 28, 2021, pp. 1-6.

International Search Report from PCT/CN2022/117992 dated Dec. 5, 2022. (10 pages).

* cited by examiner

NEURO-SYMBOLIC REINFORCEMENT LEARNING WITH FIRST-ORDER LOGIC

BACKGROUND

The present invention relates generally to machine learning, and more specifically, to methods and systems for employing neuro-symbolic reinforcement learning (RL) with first-order logic (FOL).

Deep reinforcement learning (RL) has been successfully applied to many applications, such as computer games, text-based games, and robot control applications. However, these methods require many training trials for converging to the optimal action policy, and the trained action policy is not understandable for human operators. This is because, although the training results are sufficient, the policy is stored in a black-box deep neural network. These issues become relevant when the human operator wants to solve a real-world problem and verify the trained rules. If the trained rules are understandable and modifiable, the human operator can control them and design an action restriction. While using a symbolic (logical) format as representation for stored rules is suitable for achieving interpretability and quick training, it is difficult to train the logical rules with a traditional training approach.

SUMMARY

In accordance with an embodiment, a computer-implemented method for reinforcement learning (RL) with Logical Neural Networks (LNNs) is provided. The computer-implemented method includes receiving a plurality of observation text sentences from a target environment, extracting one or more propositional logic values from the plurality of observation text sentences, finding a class for each propositional logic value by using external knowledge, converting, by an FOL converter, each propositional logic value into a first-order logic (FOL) by replacing a part in the propositional logic value with a variable word, the part indicating the class, selecting a LNN based on the class among LNNs prepared in advance for each class, each LNN receiving the one or more propositional logic values as a status input and outputting an action with a score indicating a degree of preference for taking the action, and performing a highest score action to the target environment to obtain a next state of the target environment and a reward for the highest score action.

In accordance with another embodiment, a computer program product for reinforcement learning (RL) with Logical Neural Networks (LNNs) is provided. The computer program product includes a computer readable storage medium having program instructions embodied therewith, the program instructions executable by a computer to cause the computer to receive a plurality of observation text sentences from a target environment, extract one or more propositional logic values from the plurality of observation text sentences, find a class for each propositional logic value by using external knowledge, convert, by an FOL converter, each propositional logic value into a first-order logic (FOL) by replacing a part in the propositional logic value with a variable word, the part indicating the class, select a LNN based on the class among LNNs prepared in advance for each class, each LNN receiving the one or more propositional logic values as a status input and outputting an action with a score indicating a degree of preference for taking the action, and perform a highest score action to the target environment to obtain a next state of the target environment and a reward for the highest score action.

In accordance with yet another embodiment, a system for reinforcement learning (RL) with Logical Neural Networks (LNNs) is provided. The system includes a memory and one or more processors in communication with the memory configured to receive a plurality of observation text sentences from a target environment, extract one or more propositional logic values from the plurality of observation text sentences, find a class for each propositional logic value by using external knowledge, convert, by an FOL converter, each propositional logic value into a first-order logic (FOL) by replacing a part in the propositional logic value with a variable word, the part indicating the class, select a LNN based on the class among LNNs prepared in advance for each class, each LNN receiving the one or more propositional logic values as a status input and outputting an action with a score indicating a degree of preference for taking the action, and perform a highest score action to the target environment to obtain a next state of the target environment and a reward for the highest score action.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Embodiments in accordance with the present invention provide methods and devices for neuro-symbolic reinforcement learning (RL) with first-order logic (FOL). Deep RL methods often require many trials before convergence, and no direct interpretability of trained policies is provided. In order to achieve fast convergence and interpretability for the policy in RL, the exemplary methods introduce a RL method for text-based games with a neuro-symbolic framework called Logical Neural Network (LNN), which can learn symbolic and interpretable rules in their differentiable network. The exemplary method extracts first-order logical facts from text observations and an external word meaning network (e.g., ConceptNet), and then trains a policy in the network with directly interpretable logical operators.

In order to train logical rules, a neuro-symbolic framework referred to as LNN has been proposed to simultaneously provide key properties of both the neural network (learning) and the symbolic logic (reasoning). The LNN can train the symbolic rules with logical functions in the neural networks by having an end-to-end differentiable network minimize a contradiction loss. Every neuron in the LNN has a component for a formula of weighted real-valued logics from a unique logical conjunction, disjunction, or negation nodes, and then it can calculate the probability and logical contradiction loss during the inference and training. At the same time, the trained LNN can extract obtained logical rules by selecting high weighted connections that represent the important rules for an action policy.

In view thereof, the exemplary embodiments of the present invention implement an action knowledge acquisition method featuring a neuro-symbolic LNN framework for the RL algorithm.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
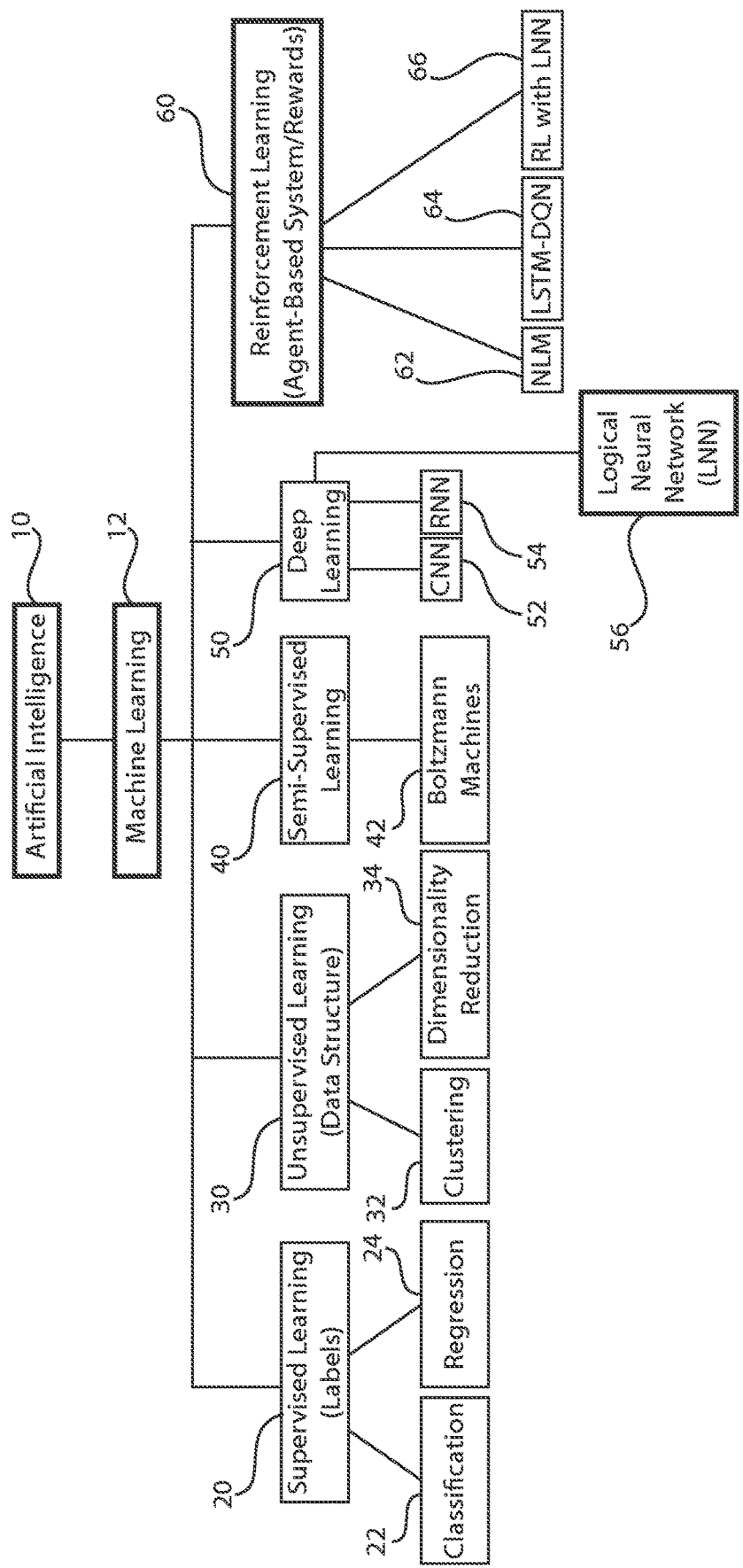
FIG. 1 is a block/flow diagram of an exemplary breakdown of machine learning in artificial intelligence (AI) and where reinforcement learning (RL) with logical neural networks (LNNs) fits in, in accordance with an embodiment of the present invention.

FIG. 1 is a block/flow diagram of an exemplary breakdown of machine learning in artificial intelligence (AI) and where Fitted Q-Iteration fits in, in accordance with an embodiment of the present invention.

Artificial intelligence 10 includes machine learning 12. Machine learning 12 can be divided into supervised learning 20, unsupervised learning 30, semi-supervised learning 40, deep learning 50, and reinforcement learning 60.

Supervised learning 20 can include, e.g., classification 22 and regression 24.

Unsupervised learning 30 can include, e.g., clustering 32 and dimensionality reduction 34.

Semi-supervised learning 40 can include, e.g., application of Boltzmann machines 42.

Deep learning 50 can include, e.g., convolutional neural networks (CNN) 52, recurrent neural networks (RNN) 54, and logical neural networks (LNN) 56.

Reinforcement learning 60 can include neural logic machines (NLM) 62, long short-term memory deep Q-network (LSTM-DQN) 64, and RL with LNN 66.

Regarding LNN 56 and the use of RL with LNN 66, LNNs are a neuro-symbolic framework designed to simultaneously provide key properties of both neural nets (NNs) (learning) and symbolic logic (knowledge and reasoning) toward direct interpretability, utilization of rich domain knowledge realistically, and the general problem-solving ability of a full theorem prover. The central idea is to create a 1-to-1 correspondence between neurons and the elements of logical formulae, using the observation that the weights of neurons can be constrained to act as, e.g., AND gates or OR gates. In LNNs, no conversions are needed because they are identical. Inputs include a propositional or first-order logic (FOL) knowledge base (KB), including the usual training data (feature-value pairs).

Thus, LNN is a form of neural network (NN) with a 1-to-1 correspondence to a set of logical formulae in any of various systems of weighted, real-valued logic, in which evaluation performs logical inference. Key innovations that set LNNs aside from other neural networks are neural activation functions constrained to implement the truth functions of the logical operations they represent, (e.g., in FOL, $\forall$ and $\exists$) results expressed in terms of bounds on truth values so as to distinguish known, approximately known, unknown, and contradictory states, and bidirectional inference permitting, e.g., x→y to be evaluated in addition to being able to prove y given x. The nature of the modeled system of logic depends on the family of activation functions chosen for the network's neurons, which implement the logic's various atoms and operations. In particular, it is possible to constrain the network to behave exactly classically when provided classical input. Computation is characterized by tightening bounds on truth values at neurons pertaining to sub-formulae in upward and downward passes over the represented formulae's syntax trees. Bounds tightening is monotonic. Accordingly, computation cannot oscillate and necessarily converges for propositional logic. Because of the network's modular construction, it is possible to partition and/or compose networks, inject formulae serving as logical constraints or queries, and control which parts of the network (or individual neurons) are trained or evaluated.

Inputs are initial truth value bounds for each of the neurons in the network. In particular, neurons pertaining to predicate atoms may be populated with truth values taken from knowledge base data. Additional inputs may take the form of injected formulae representing a query or specific inference problem. Outputs are usually the final computed truth value bounds at one or more neurons pertaining to specific atoms or formulae of interest.

Figure 2:
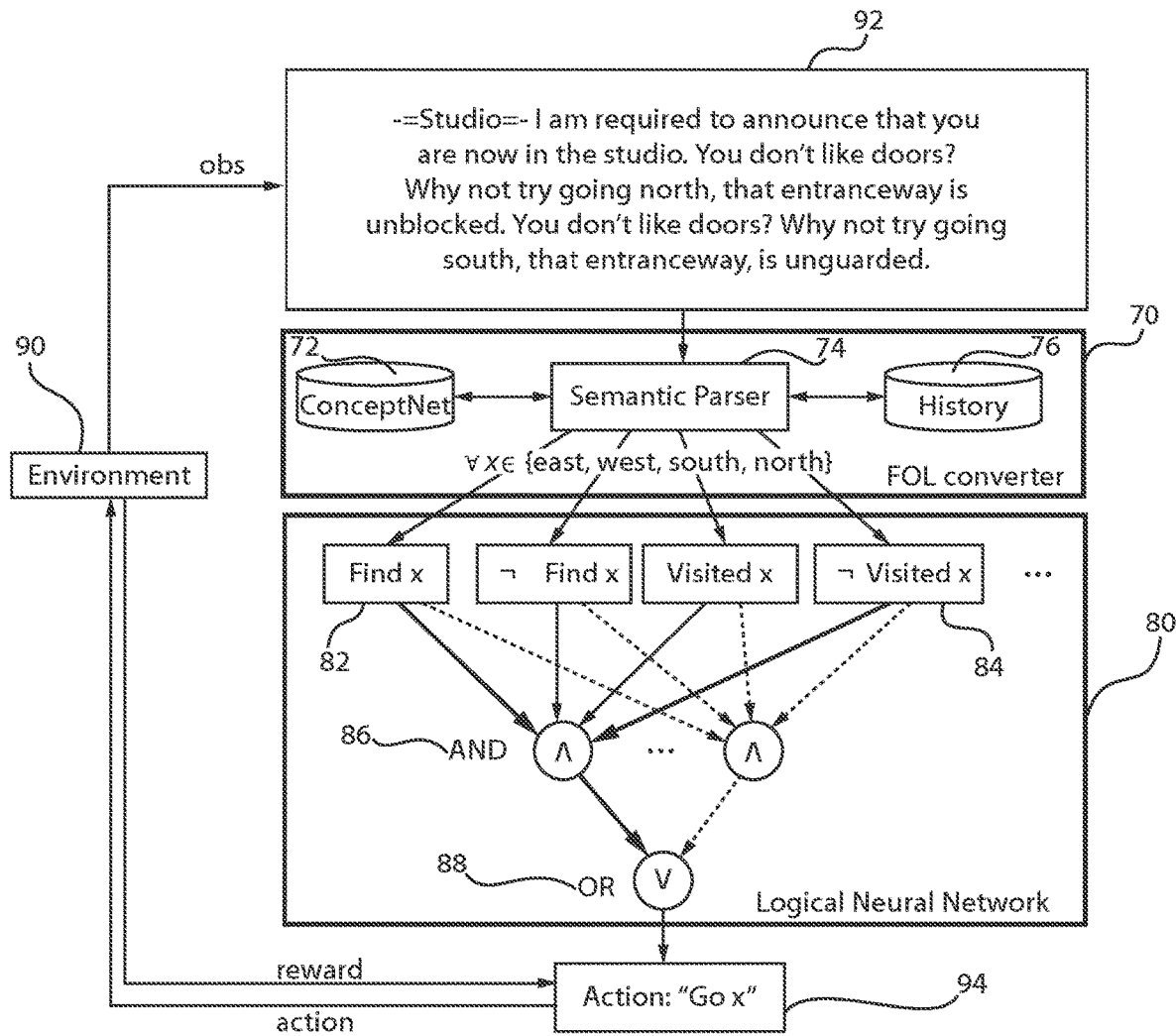
FIG. 2 illustrates an exemplary RL LNN architecture, in accordance with an embodiment of the present invention.

FIG. 2 illustrates an exemplary RL LNN architecture, in accordance with an embodiment of the present invention.

The agent takes a text observation from the environment 90, and the first-order logical facts are extracted from an FOL converter 70 that uses a semantic parser 74, ConceptNet 72, and history data 76. The weights of the LNN 80 are updated by these extracted predicate logics. Solid lines show one trained rule, that is, when the agent finds a direction x (82) and the direction x has not been visited (84), taking a "Go x" action 94 is preferred choice for the agent. Dashed lines show the initial connections before training. The LNN network 80 includes, e.g., two AND gates 86 and a single OR gate 88.

In FIG. 2, the observation text 92 is input to a semantic parser 74 to extract the logical values of each propositional logic. In this case, the semantic parser 74 finds there are two exits (north and south). The method then converts first-order logical (predicates) facts from the propositional logics and categories of each word, such as $\exists x \in \{south, north\}$, <find x>=True and $\exists x \in \{east, west\}$, <find x>=False. These extracted predicated logics are fed into LNN 80, which has some conjunction gates 86 and one disjunction gate 88. The LNN 80 trains the weights for these connections by the reward value to obtain the action policy.

As text-based games are sequential decision-making problems, they can naturally be applied to RL. These games are partially observable Markov decision processes (POMDP), where the observation text does not include the entire information of the environment. Formally, the game is a discrete-time POMDP defined by <S, A, T, R, ω, O, γ>, where S is a set of states ($s_t \in S$), A is a set of actions, T is a set of transition probabilities, R is a reward function, co is a set of observations ($o_t \in \omega$), O is a set of conditional observation probabilities, and γ is a discount factor. Although the state $s_t$ includes the complete internal information, the observation $o_t$ does not. The exemplary embodiments of the present invention follow two assumptions, that is, the word in each command is taken from a fixed vocabulary V, and each action command includes two words (verb and object). The objective for the agent is to maximize the expected discounted reward $E[\Sigma_t \gamma^t r_t]$.

The exemplary method includes two processes, that is, converting text into first-order logic (FOL), and training the action policy in LNN.

The FOL converter 70 converts a given natural observation text $o_t$ and observation history ($o_{t-1}$; $o_{t-2}$; . . . ) into first-order logic facts. The method first converts text into propositional logics $l_{i,t}$ by a semantic parser from $o_t$, such as, the agent understands an opened direction from the current room. The agent then retrieves the class type c of the word meaning in propositional logic $l_{i,t}$ by using ConceptNet 72 or the classification network of another word's definition. For example, "east" and "west" are classified as a direction-type, and "coin" is as a money-type. The class is used for selecting the appropriate LNN for FOL training and inference.

The LNN training component 80 is used for obtaining an action policy from the given FOL logics. LNN has logical conjunction (AND), logical disjunction (OR), negation (NOT), an universal quantifier (ForAll), and existential quantifier (Exist) nodes directly in its neural network. In the exemplary method, an AND-OR network (86, 88) is prepared for training arbitrary rules from given inputs. As shown in FIG. 2, all logical facts are prepared at the first layer, several AND gates (as many as the network is required) at the second layer, and one OR gate connected to all previous AND gates. During the training, the reward value is used for adding a new AND gate, and for updating the weight value for each connection. More specifically, the exemplary method is storing the replay buffer which has current observation $o_t$, action $a_t$, reward $r_t$, and next observation $o_{t+1}$ value.

For each training step, the exemplary method selects some replies, set of ($o_t$, $a_t$, $r_t$, $o_{t+1}$), and the exemplary method extracts first-order logical facts from current observation $o_t$ and action $a_t$. The LNN trains by this fact inputs and reward, which means that it forwards from the input facts through the LNN, calculates a loss values from the computed reward value and ground truth reward value, and optimizes weights in the LNN. The optimization function need not be specified herein.

The training mechanism is similar to deep Q-network (DQN), the difference from that being the network. To aid the interpretability of node values, the exemplary methods define a threshold $\alpha \in [\frac{1}{2}, 1]$ such that a continuous value is considered True if the value is in $[\alpha, 1]$, and False if it is in $[0, 1-\alpha]$.

Algorithm 1, reproduced below, describes the algorithm for the exemplary method.

| Algorithm 1 RL by FOL-LNN |
|---|
| 1: procedure REINFORCEMENT LEARNING |
| 2:   for t = 1, 2, 3, ... do |
| 3:     $o_t$ ← Observe observation |
| 4:     $l_{t,i}$ ← Extract logic from $o_t$, $o_{t-1}$;... |
| 5:     for i = 1, 2, 3, ... do |
| 6:       c ← Find class from ConceptNet |
| 7:       $\theta^c$ ← Select LNN |
| 8:       $l^c_{t,i}$ ← Convert into FOL logic |
| 9:       $a_{t,i}$ ← $\theta^c(l^c_{t,i})$ |
| 10:     end for |
| 11:     $a_t$ ← arg max $a_{t,i}$ |
| 12:     $r_t$, $o_{t+1}$ ← Get reward and next obs |
| 13:     Store reply ⟨$o_t$, $a_t$, $r_t$, $o_{t+1}$⟩ |
| 14:     $\nabla \theta$ ← Update LNN from reply |
| 15:   end for |
| 16: end procedure |

Figure 3:
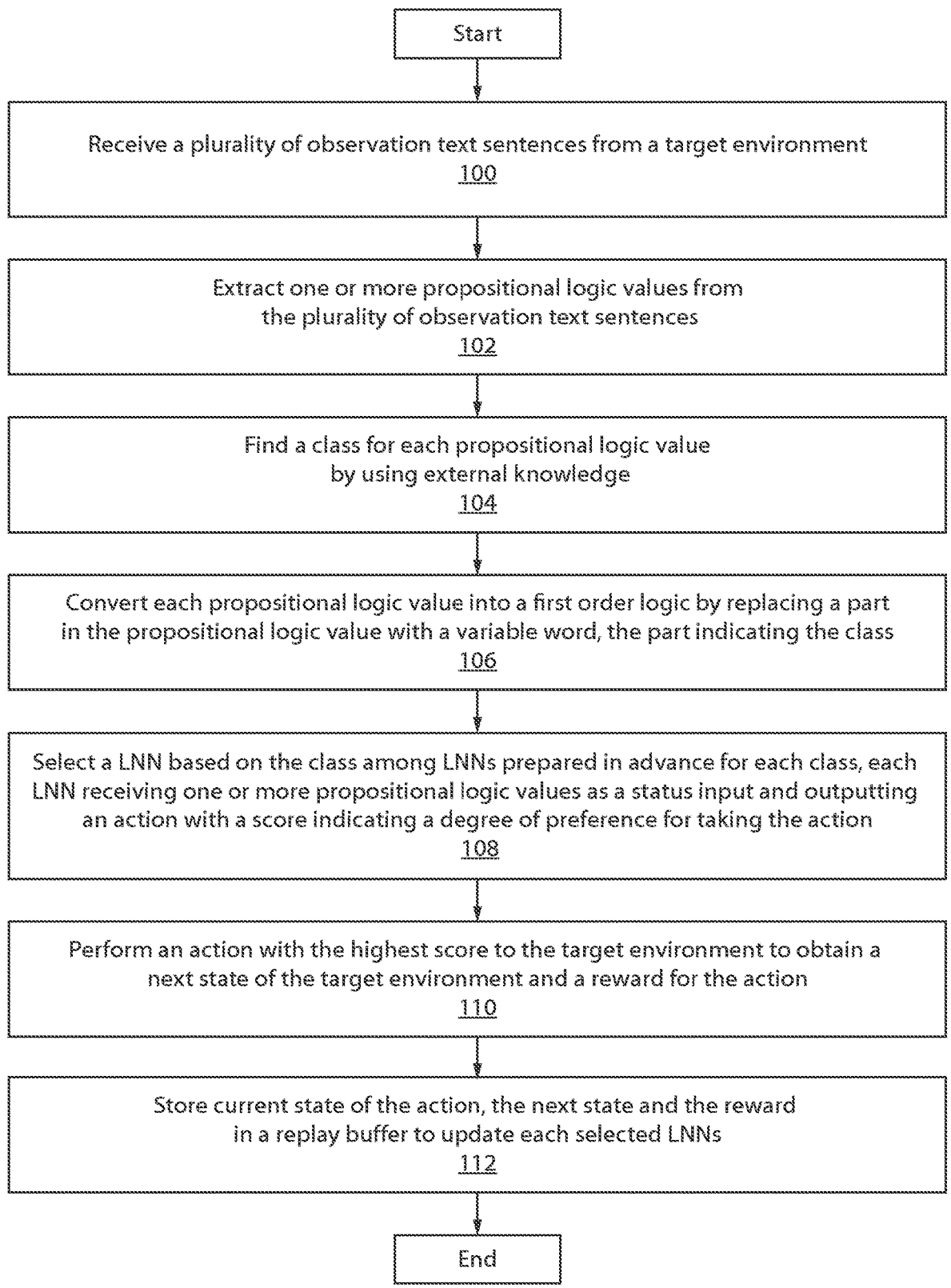
FIG. 3 illustrates an exemplary method for employing neuro-symbolic RL with first-order logic (FOL), in accordance with an embodiment of the present invention.

FIG. 3 illustrates an exemplary method for employing neuro-symbolic RL with first-order logic (FOL), in accordance with an embodiment of the present invention.

At block 100, receive a plurality of observation text sentences from a target environment.

At block 102, extract one or more propositional logic values from the plurality of observation text sentences.

At block 104, find a class for each propositional logic value by using external knowledge.

At block 106, convert each propositional logic value into a first-order logic by replacing a part in the propositional logic value with a variable word, the part indicating the class.

At block 108, select an LNN based on the class among LNNs prepared in advance for each class, each LNN receiving one or more propositional logic values as a status input and outputting an action with a score indicating a degree of preference for taking the action.

At block 110, perform an action with the highest score to the target environment to obtain a next state of the target environment and a reward for the action.

At block 112, store a current state of the action, the next state and the reward in a replay buffer to update each selected LNNs.

Figure 4:
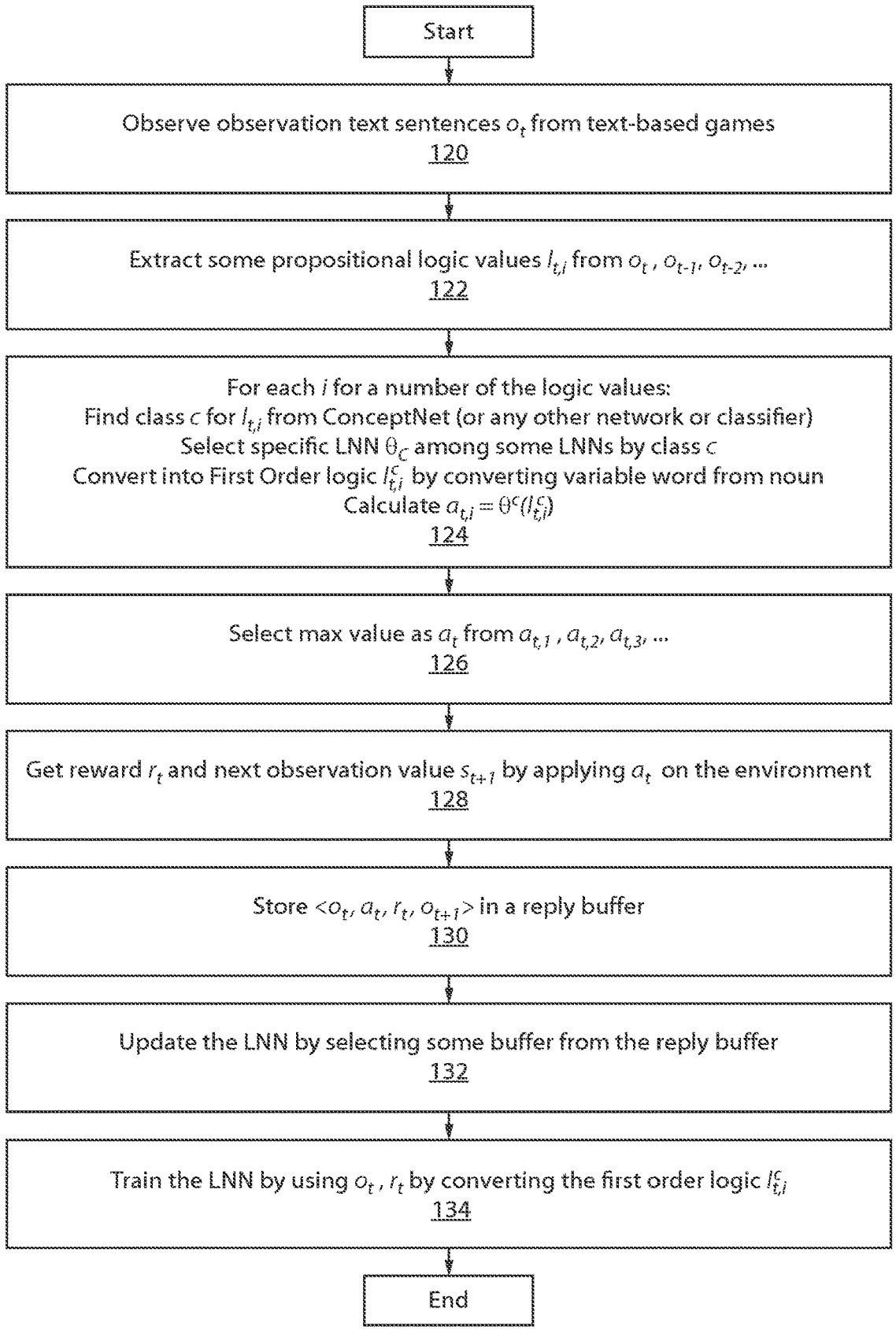
FIG. 4 illustrates an exemplary method for training for RL, in accordance with an embodiment of the present invention.

FIG. 4 illustrates an exemplary method for training for RL, in accordance with an embodiment of the present invention.

At block 120, observe observation text sentences $o_t$ from text-based games.

At block 122, extract some propositional logic values $l_{t,i}$ from $o_t$, $o_{t-1}$, $o_{t-2}$, . . . .

At block 124, for each i for a number of the logic values:

Find class c for $l_{t,i}$ from ConceptNet (or any other network or other classifier)

Select specific LNN $\theta_c$, among some LNNs by class c.

Convert into first-order logic $l_{t,i}^c$ by converting a variable word from a noun.

Calculate $a_{t,i} = \theta^c(l_{t,i}^c)$.

At block 126, select max value as $a_t$ from $a_{t,1}$, $a_{t,2}$, $a_{t,3}$, . . . .

At block 128, get reward $r_t$ and the next observation value $s_{t+1}$ by applying $a_t$ on the environment.

At block 130, store ($o_t$, $a_t$, $r_t$, $o_{t+1}$) in a reply buffer.

At block 132, update the LNN by selecting some sets of values from the reply buffer.

At block 134, train the LNN by using $o_t$, $r_t$, $a_t$, $o_{t+i}$ by converting the first-order logic $l_{t,i}^c$.

In conclusion, the exemplary embodiments of the present invention implement a neuro-symbolic RL for text-based interaction games. The exemplary methods introduce an algorithm for extracting first-order logical facts from given textual observations by using agent history and ConceptNet as external knowledge. The first-order logical facts are extracted by an FOL converter using a semantic parser and the LNN trains the given logical inputs. The trained rule must be interpretable via logical functions and for each LNN, the LNN storing the rules for each type of word.

Figure 5:
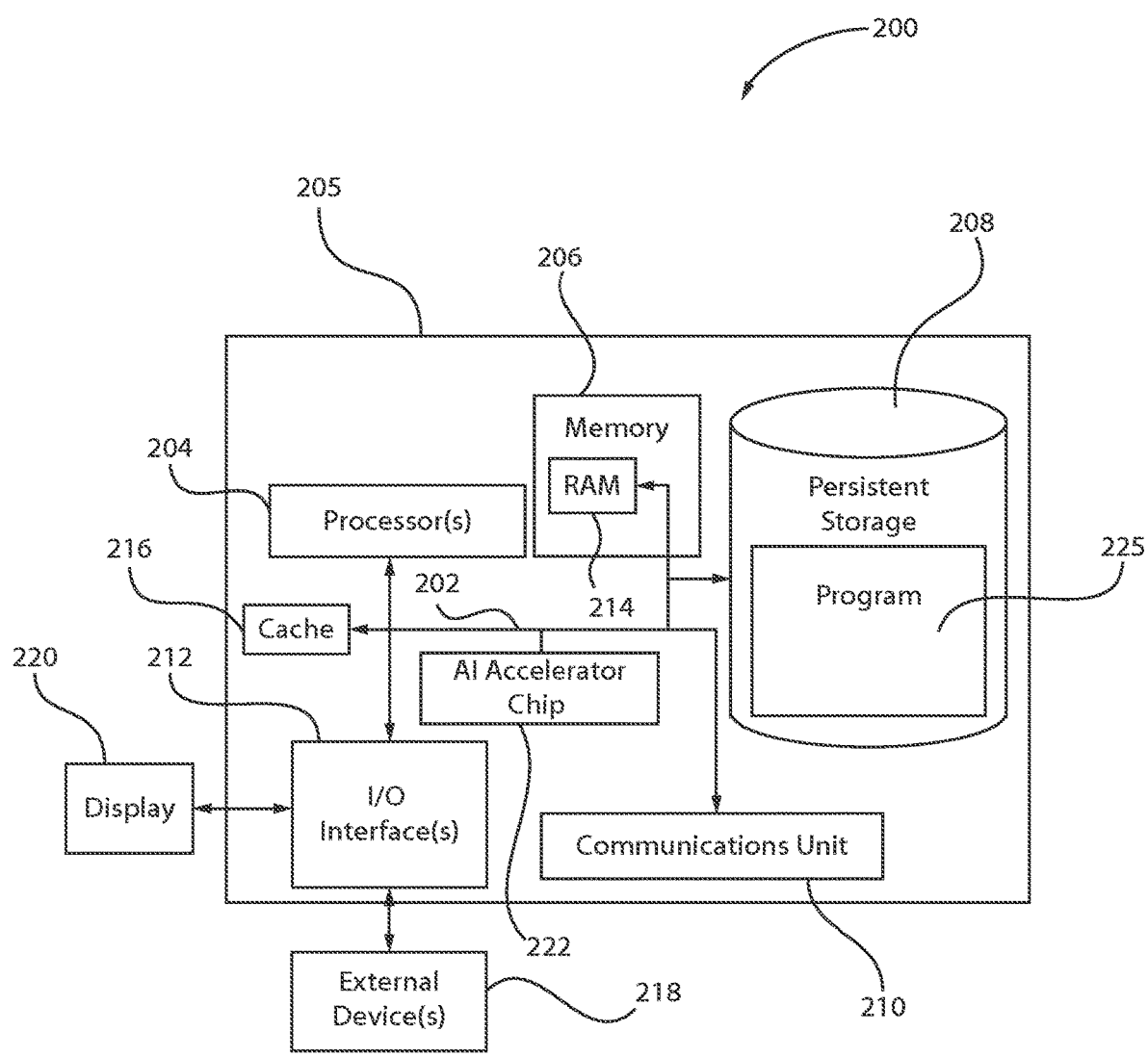
FIG. 5 is a block/flow diagram of an exemplary processing system for employing the neuro-symbolic RL with FOL, in accordance with an embodiment of the present invention.

FIG. 5 is a block/flow diagram of an exemplary processing system for employing the neuro-symbolic RL with FOL, in accordance with an embodiment of the present invention.

FIG. 5 depicts a block diagram of components of system 200, which includes computing device 205. It should be appreciated that FIG. 5 provides only an illustration of one implementation and does not imply any limitations with regard to the environments in which different embodiments can be implemented. Many modifications to the depicted environment can be made.

Computing device 205 includes communications fabric 202, which provides communications between computer processor(s) 204, memory 206, persistent storage 208, communications unit 210, and input/output (I/O) interface(s) 212. Communications fabric 202 can be implemented with any architecture designed for passing data and/or control information between processors (such as microprocessors, communications and network processors, etc.), system memory, peripheral devices, and any other hardware components within a system. For example, communications fabric 202 can be implemented with one or more buses.

Memory 206, cache memory 216, and persistent storage 208 are computer readable storage media. In this embodiment, memory 206 includes random access memory (RAM) 214. In another embodiment, the memory 206 can be flash memory. In general, memory 206 can include any suitable volatile or non-volatile computer readable storage media.

In some embodiments of the present invention, program 225 is included and operated by AI accelerator chip 222 as a component of computing device 205. In other embodiments, program 225 is stored in persistent storage 208 for execution by AI accelerator chip 222 (to implement neuro-symbolic RL with FOL) in conjunction with one or more of the respective computer processors 204 via one or more memories of memory 206. In this embodiment, persistent storage 208 includes a magnetic hard disk drive. Alternatively, or in addition to a magnetic hard disk drive, persistent storage 208 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 208 can also be removable. For example, a removable hard drive can be used for persistent storage 208. Other examples include optical and magnetic disks, thumb drives, and smart cards that are inserted into a drive for transfer onto another computer readable storage medium that is also part of persistent storage 208.

Communications unit 210, in these examples, provides for communications with other data processing systems or devices, including resources of distributed data processing environment. In these examples, communications unit 210 includes one or more network interface cards. Communications unit 210 can provide communications through the use of either or both physical and wireless communications links. Deep learning program 225 can be downloaded to persistent storage 208 through communications unit 210.

I/O interface(s) 212 allows for input and output of data with other devices that can be connected to computing system 200. For example, I/O interface 212 can provide a connection to external devices 218 such as a keyboard, keypad, a touch screen, and/or some other suitable input device. External devices 218 can also include portable computer readable storage media such as, for example, thumb drives, portable optical or magnetic disks, and memory cards.

Display 220 provides a mechanism to display data to a user and can be, for example, a computer monitor.

Figure 6:
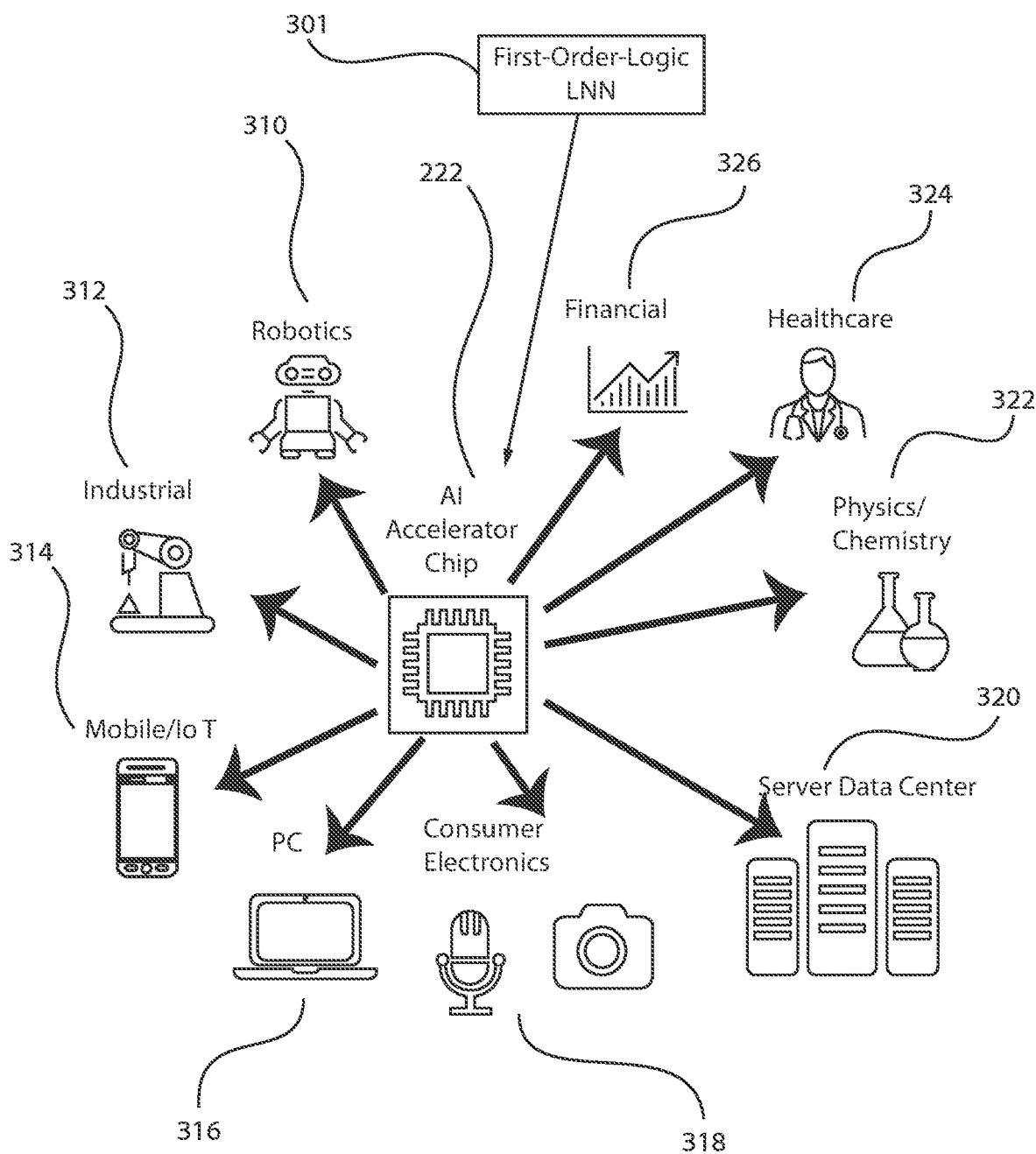
FIG. 6 illustrates practical applications for employing the neuro-symbolic RL with FOL via an artificial intelligence (AI) accelerator chip, in accordance with an embodiment of the present invention.

FIG. 6 illustrates practical applications for employing the neuro-symbolic RL with FOL via an artificial intelligence (AI) accelerator chip, in accordance with an embodiment of the present invention.

The artificial intelligence (AI) accelerator chip 222 can implement the neuro-symbolic RL with FOL 301, and can be used in a wide variety of practical applications, including, but not limited to, robotics 310, industrial applications 312, mobile or Internet-of-Things (IoT) 314, personal computing 316, consumer electronics 318, server data centers 320, physics and chemistry applications 322, healthcare applications 324, and financial applications 326.

Figure 7:
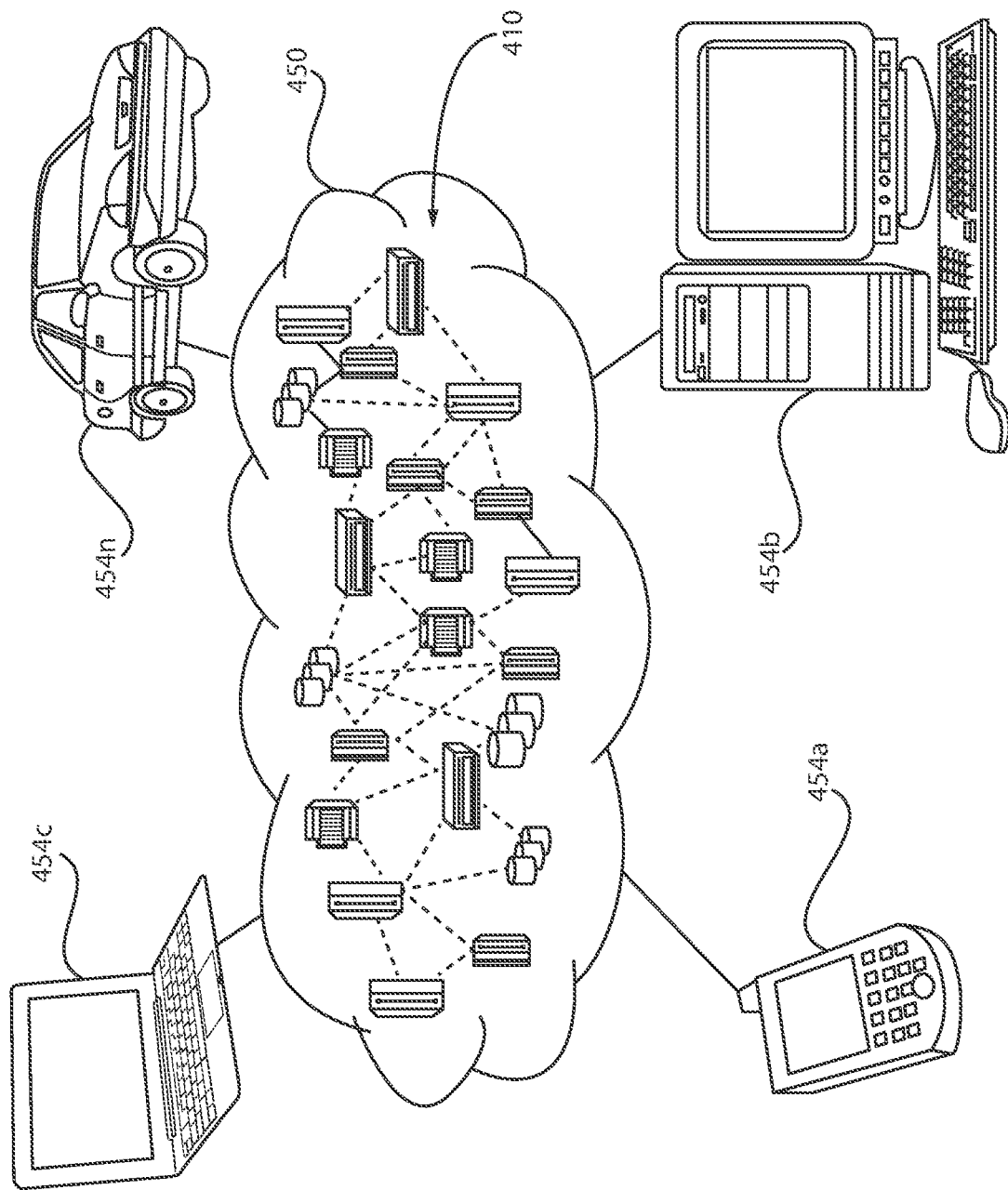
FIG. 7 is a block/flow diagram of an exemplary cloud computing environment, in accordance with an embodiment of the present invention.

FIG. 7 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 450 is depicted for enabling use cases of the present invention. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N can communicate. Nodes 410 can communicate with one another. They can be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 7 are intended to be illustrative only and that computing nodes 410 and cloud computing environment 450 can communicate with any type of computerized device over any type of network and/or network addressable connection (e.g., using a web browser).

Figure 8:
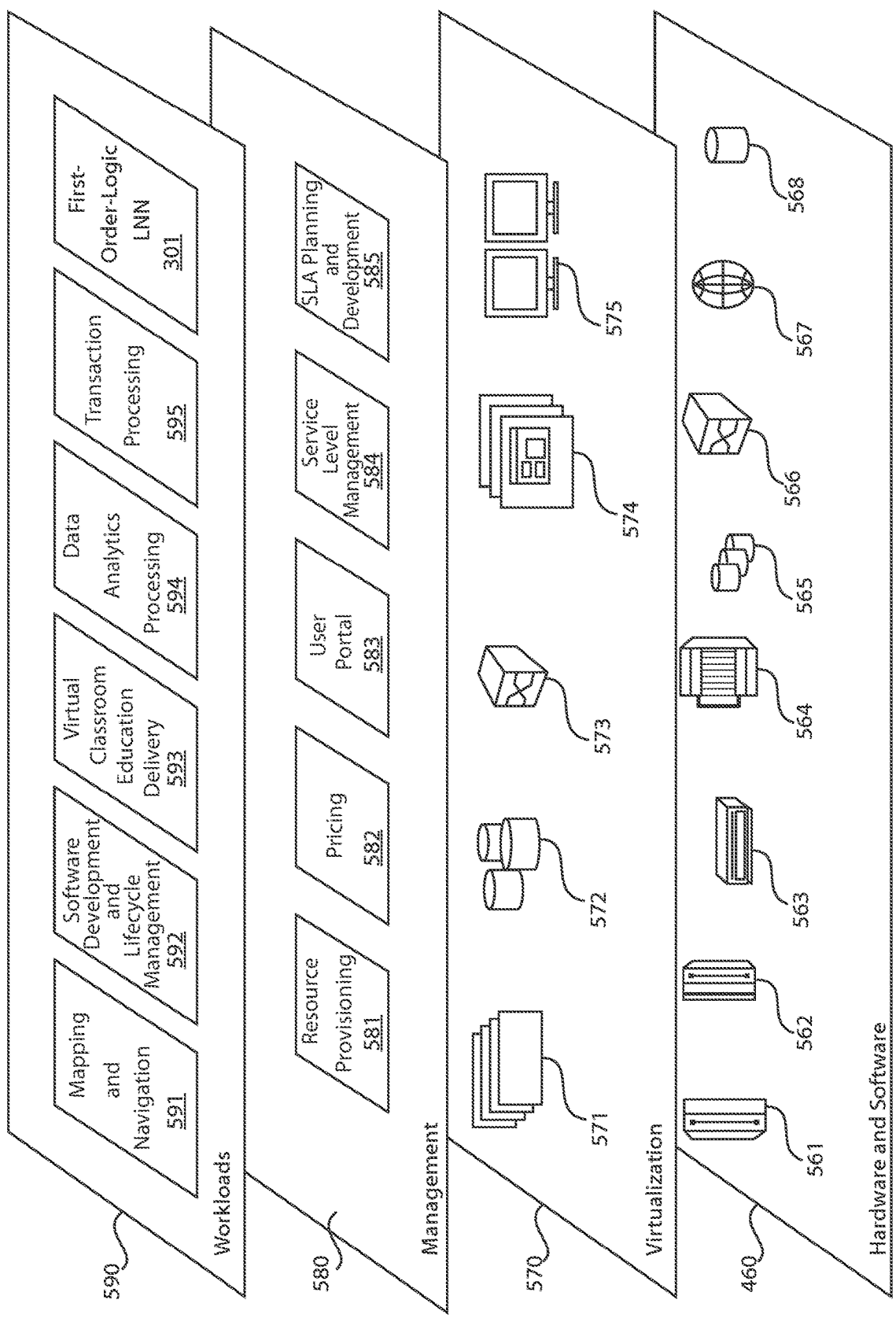
FIG. 8 is a schematic diagram of exemplary abstraction model layers, in accordance with an embodiment of the present invention.

FIG. 8 is a schematic diagram of exemplary abstraction model layers, in accordance with an embodiment of the present invention. It should be understood in advance that the components, layers, and functions shown in FIG. 8 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities can be provided: virtual servers 571; virtual storage 572; virtual networks 573, including virtual private networks; virtual applications and operating systems 574; and virtual clients 575.

In one example, management layer 580 can provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment can be utilized. Examples of workloads and functions which can be provided from this layer include: mapping and navigation 541; software development and lifecycle management 592; virtual classroom education delivery 593; data analytics processing 594; transaction processing 595; and neuro-symbolic RL with FOL 301.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory, a read-only memory, an erasable programmable read-only memory (EPROM or Flash memory), a static random access memory, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a method for employing neuro-symbolic reinforcement learning (RL) with first-order-logic (FOL) (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for reinforcement learning (RL) with Logical Neural Networks (LNNs), the method comprising:
   receiving a plurality of observation text sentences from a target environment;
   extracting one or more propositional logic values from the plurality of observation text sentences;
   finding a class for each propositional logic value by using external knowledge;
   converting, by an FOL converter, each propositional logic value into a first-order logic (FOL) by replacing a part in the propositional logic value with a variable word, the part indicating the class;
   selecting a LNN based on the class among LNNs prepared in advance for each class, each LNN receiving the one or more propositional logic values as a status input and outputting an action with a score indicating a degree of preference for taking the action; and
   performing a highest score action to the target environment to obtain a next state of the target environment and a reward for the highest score action.

2. The computer-implemented method of claim 1, further comprising storing the current state, the highest score action, the next state, and the reward in a replay buffer to update each selected LNN.

3. The computer-implemented method of claim 1, further comprising generating the FOL based on a history of the states of the target environment.

4. The computer-implemented method of claim 1, wherein the FOL converter uses a semantic parser or natural language processing method.

5. The computer-implemented method of claim 1, wherein the LNN includes one or more conjunction gates, one or more disjunction gates, one or more negation nodes, one or more universal quantifiers, and one or more existential quantifiers.

6. The computer-implemented method of claim 1, wherein an action policy is trained in the LNN from the FOL.

7. The computer-implemented method of claim 1, wherein the reward for the highest score action is used for adding one or more new nodes and for updating a weight value for each connection.

8. A computer program product for reinforcement learning (RL) with Logical Neural Networks (LNNs), the computer program product comprising a computer readable storage medium having program instructions embodied therewith, the program instructions executable by a computer to cause the computer to:
   receive a plurality of observation text sentences from a target environment;
   extract one or more propositional logic values from the plurality of observation text sentences;
   find a class for each propositional logic value by using external knowledge;
   convert, by an FOL converter, each propositional logic value into a first-order logic (FOL) by replacing a part in the propositional logic value with a variable word, the part indicating the class;
   select a LNN based on the class among LNNs prepared in advance for each class, each LNN receiving the one or more propositional logic values as a status input and outputting an action with a score indicating a degree of preference for taking the action; and
   perform a highest score action to the target environment to obtain a next state of the target environment and a reward for the highest score action.

9. The computer program product of claim 8, wherein the current state, the highest score action, the next state, and the reward are stored in a replay buffer to update each selected LNN.

10. The computer program product of claim 8, wherein the FOL is generated based on a history of the states of the target environment.

11. The computer program product of claim 8, wherein the FOL converter uses a semantic parser or natural language processing method.

12. The computer program product of claim 8, wherein the LNN includes one or more conjunction gates, one or more disjunction gates, one or more negation nodes, one or more universal quantifiers, and one or more existential quantifiers.

13. The computer program product of claim 8, wherein an action policy is trained in the LNN from the FOL.

14. The computer program product of claim 8, wherein the reward for the highest score action is used for adding one or more new nodes and for updating a weight value for each connection.

15. A system for reinforcement learning (RL) with Logical Neural Networks (LNNs), the system comprising:
   a memory; and
   one or more processors in communication with the memory configured to:
      receive a plurality of observation text sentences from a target environment;
      extract one or more propositional logic values from the plurality of observation text sentences;
      find a class for each propositional logic value by using external knowledge;

convert, by an FOL converter, each propositional logic value into a first-order logic (FOL) by replacing a part in the propositional logic value with a variable word, the part indicating the class;

select a LNN based on the class among LNNs prepared in advance for each class, each LNN receiving the one or more propositional logic values as a status input and outputting an action with a score indicating a degree of preference for taking the action; and perform a highest score action to the target environment to obtain a next state of the target environment and a reward for the highest score action.

16. The system of claim 15, wherein the current state, the highest score action, the next state, and the reward are stored in a replay buffer to update each selected LNN.

17. The system of claim 15, wherein the FOL is generated based on a history of the states of the target environment.

18. The system of claim 15, wherein the FOL converter uses a semantic parser or natural language processing method.

19. The system of claim 15, wherein the LNN includes one or more conjunction gates, one or more disjunction gates, one or more negation nodes, one or more universal quantifiers, and one or more existential quantifiers.

20. The system of claim 15, wherein an action policy is trained in the LNN from the FOL.

* * * * *